(12) United States Patent
Gouy et al.

(10) Patent No.: US 8,657,896 B2
(45) Date of Patent: Feb. 25, 2014

(54) HIGH FLOW RATE SEPARATOR HAVING PAIRED COALESCER AND DEMISTER

(75) Inventors: Laurence Gouy, Paris (FR); Francis Allouche, Le Plessis Robinson (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 183 days.

(21) Appl. No.: 13/194,998

(22) Filed: Jul. 31, 2011

(65) Prior Publication Data

US 2013/0025461 A1  Jan. 31, 2013

(51) Int. Cl.
  *B01D 50/00* (2006.01)
(52) U.S. Cl.
  USPC .......... 55/320; 95/261; 95/271; 96/184; 96/198; 96/190; 210/789; 210/787; 210/788; 210/801; 210/512.1; 210/512.2; 210/532.1; 210/538
(58) Field of Classification Search
  USPC ......... 55/320; 96/184, 189, 190; 95/261, 271; 210/787–789, 801, 512.1, 512.2, 210/532.1, 538
  See application file for complete search history.

(56) References Cited

U.S. PATENT DOCUMENTS

| | | | |
|---|---|---|---|
| 1,095,463 A * | 5/1914 | Kieser | 96/169 |
| 4,539,023 A | 9/1985 | Boley | |
| 5,064,448 A | 11/1991 | Choi | |
| 6,709,500 B1 * | 3/2004 | West | 96/216 |
| 7,654,397 B2 | 2/2010 | Allouche | |
| 2008/0105616 A1 | 5/2008 | Allouche | |

FOREIGN PATENT DOCUMENTS

| | | |
|---|---|---|
| WO | 03/066226 | 8/2003 |
| WO | 03/070348 | 8/2003 |

OTHER PUBLICATIONS

International Search Report for the equivalent PCT patent application No. PCT/IB2012/053904 issued on Feb. 7, 2013.

* cited by examiner

*Primary Examiner* — Dung H Bui
(74) *Attorney, Agent, or Firm* — Cameron R. Sneddon

(57) ABSTRACT

A separator is disclosed. The separator includes a gas/liquid separator vessel, an enclosure, a coalescer and a demister. The gas/liquid separator vessel has a first end, a second end, a first inlet, a first outlet, and a first separation chamber. The first inlet can be adjacent to the first end. The enclosure is positioned within the first separation chamber of the liquid separator vessel. The enclosure has a second inlet, a second outlet, a drain positioned therebetween, and a second separation chamber. The second inlet can be directed towards the first end of the gas/liquid separator vessel. The second separation chamber defines a flow path for a gas stream in which the flow path passes sequentially through the second inlet, second separation chamber and the second outlet. The coalescer is positioned in the second separation chamber to intercept the flow path of the gas stream. The demister is positioned in the second separation chamber between the coalescer and the second outlet to intercept the flow path of the gas stream.

20 Claims, 7 Drawing Sheets

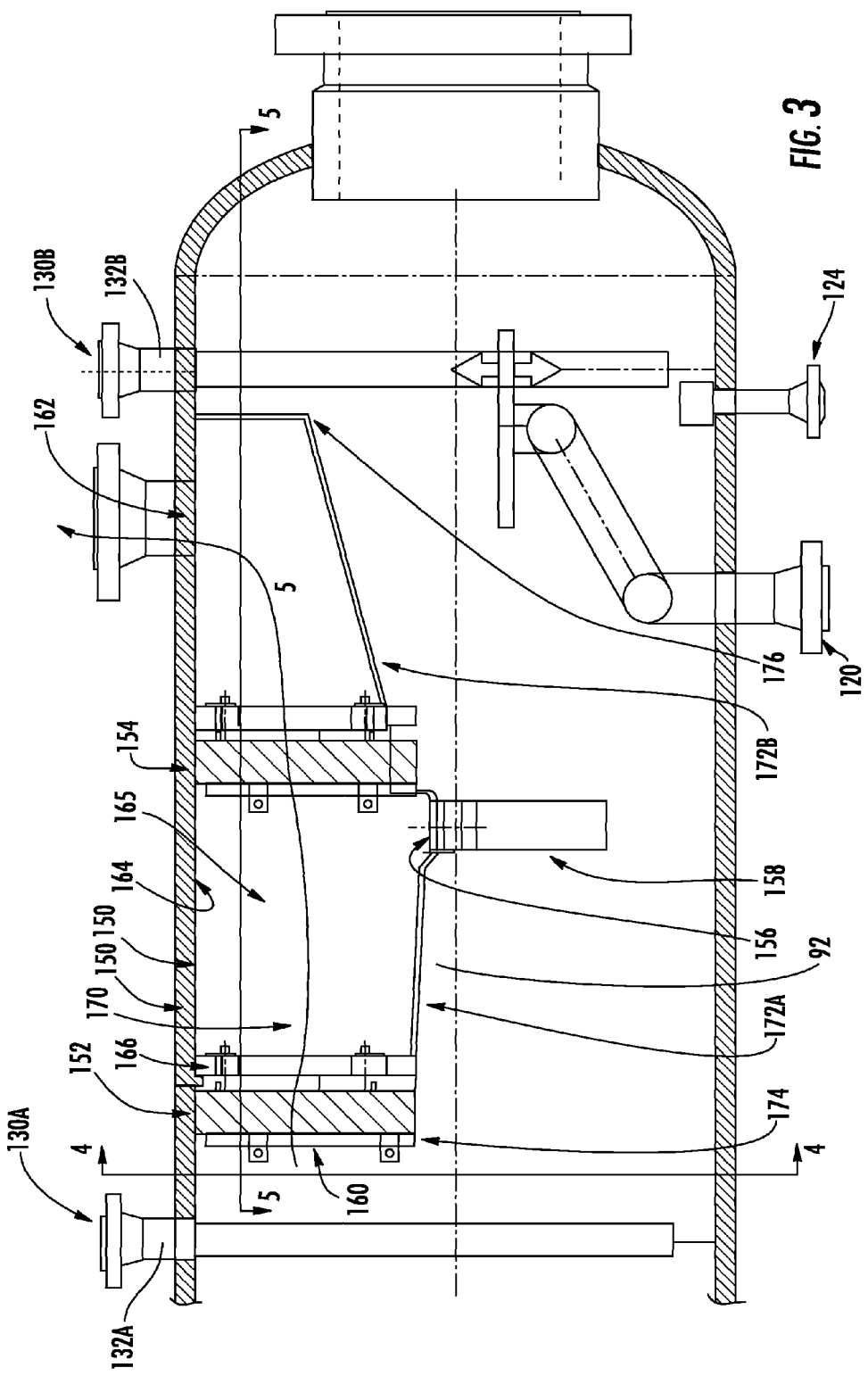

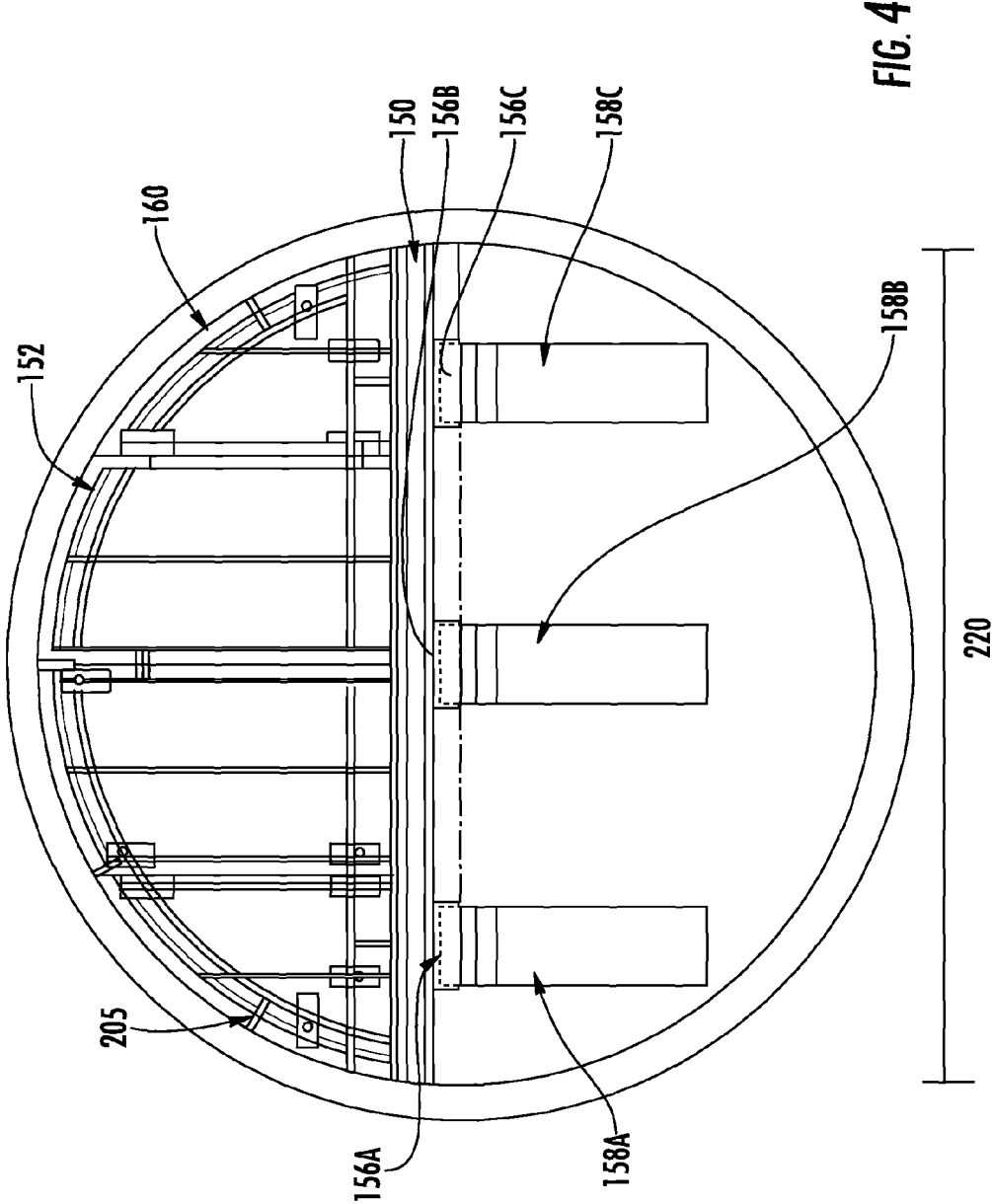

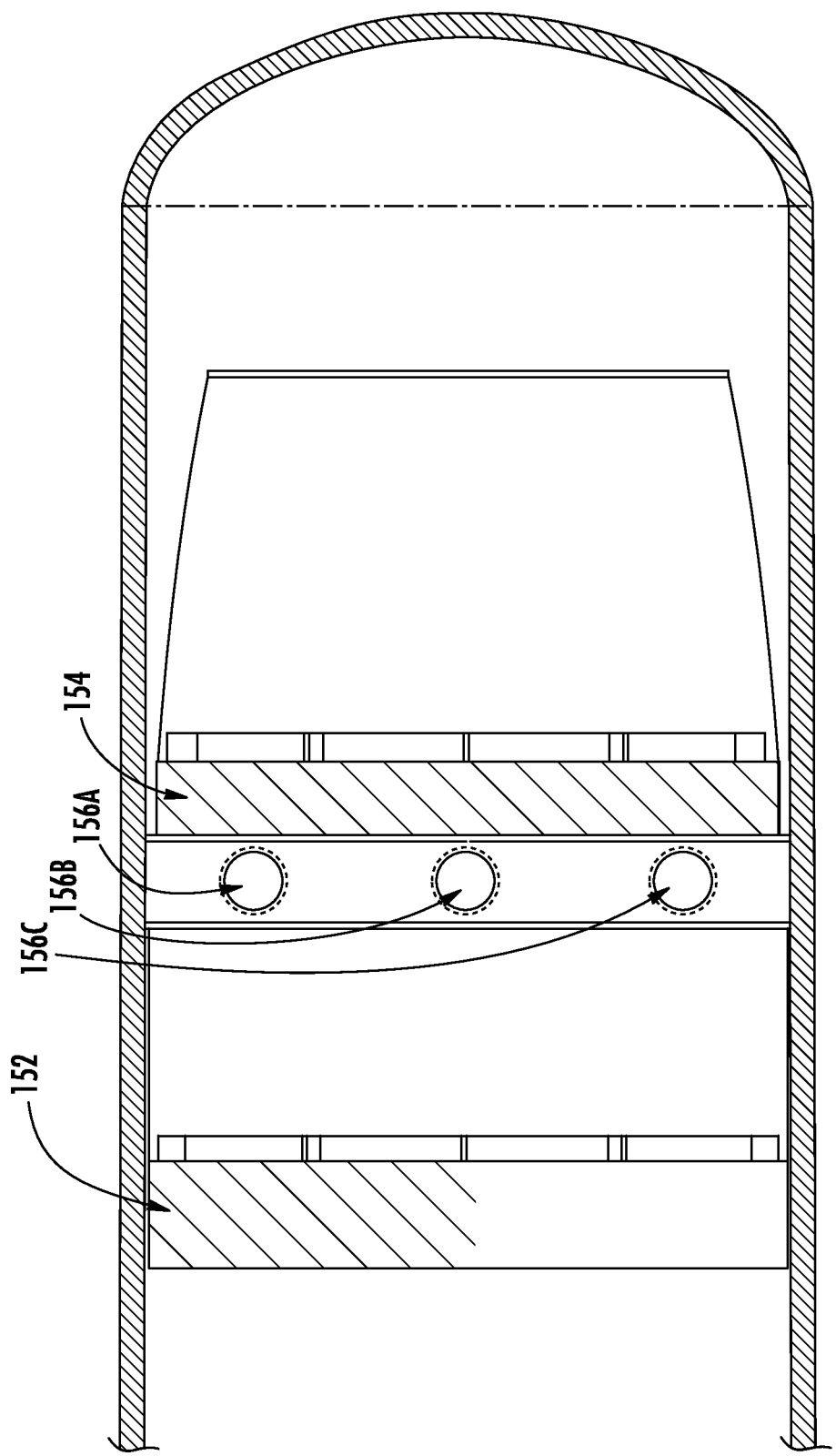

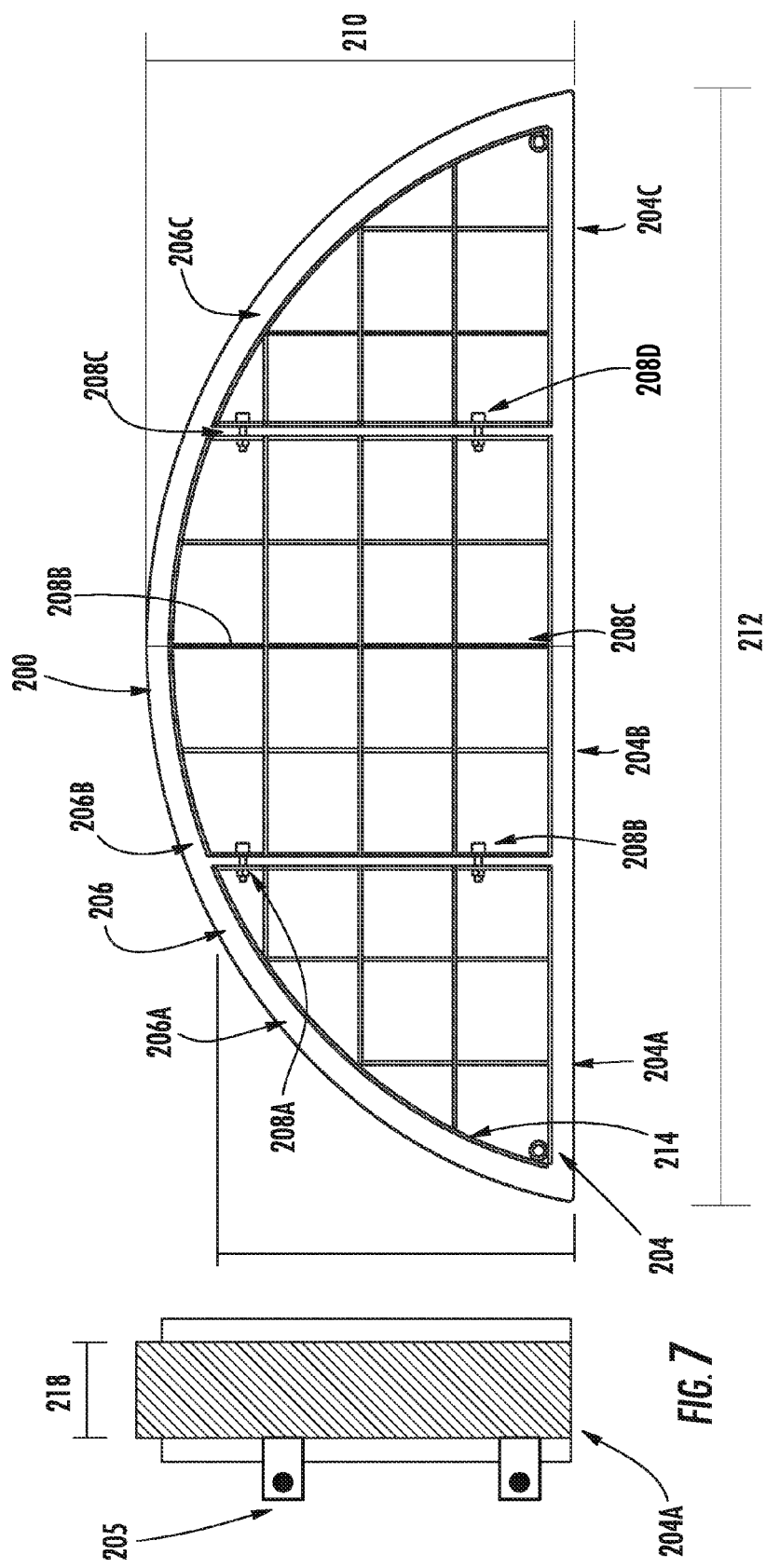

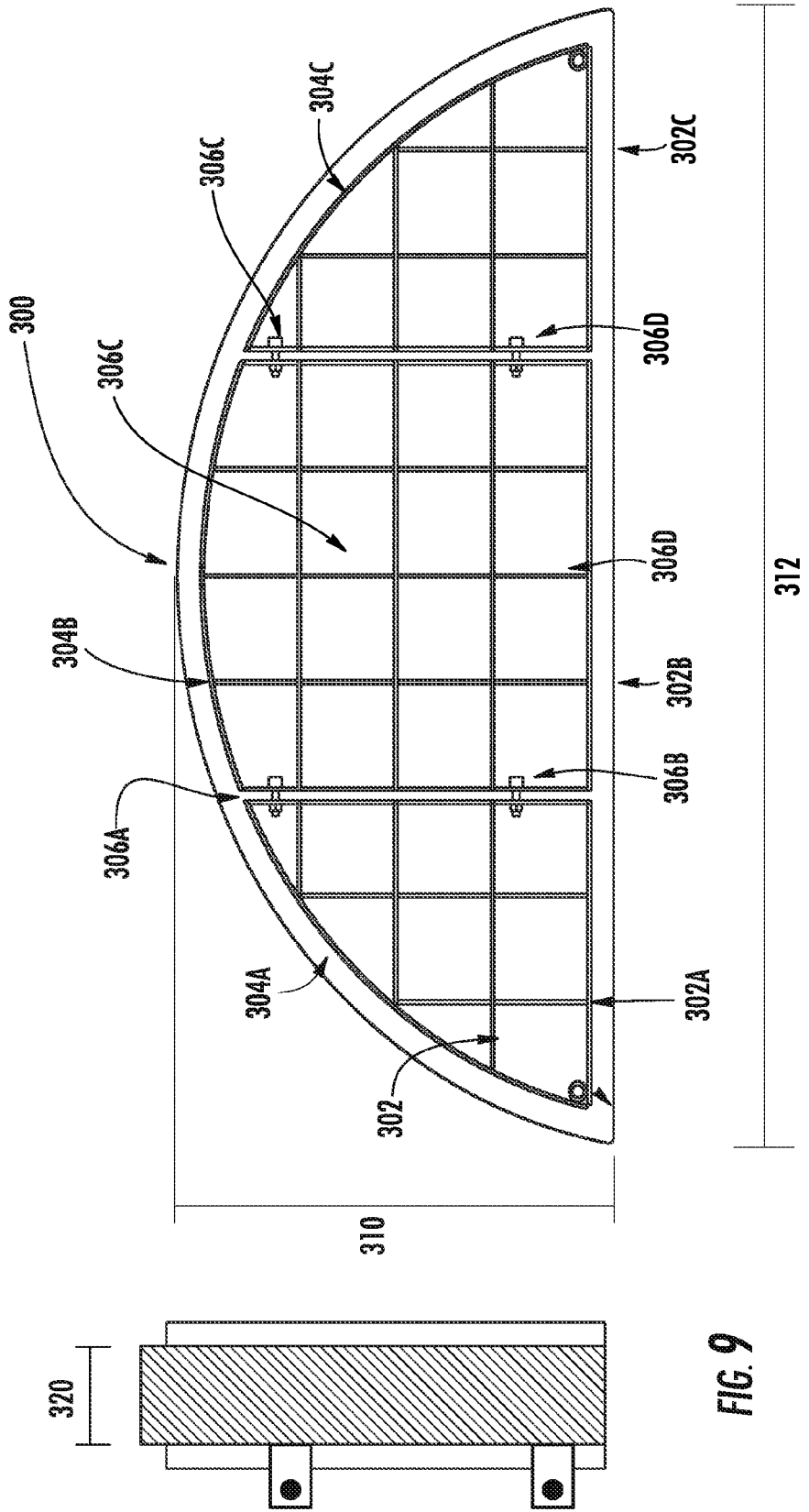

HIGH FLOW RATE SEPARATOR HAVING PAIRED COALESCER AND DEMISTER

CROSS-REFERENCE TO RELATED APPLICATIONS

Not applicable.

TECHNICAL FIELD

The present invention relates generally to separators for separating liquids and gases.

BACKGROUND ART

During well testing operations, hydrocarbons flow at surface for a short period of time. Most of the well tests occur during exploration, appraisal, and initial completion of a well. As of today, the easiest way to dispose of hydrocarbons is to burn them. Oil and gas must be separated upstream of the burners/flares to allow an effective combustion.

Different types of separators exist on the market. One of the specificities of well testing operations is that they arise at the early stage of the life of a well. After drilling operations, reservoirs are contaminated with brines and other drilling fluids. Well testing separators must thus be able to handle multiphase flow of water, oil, and gas. Vertical separators have been used in the art as well as horizontal gravitational separators. Horizontal gravitational separators are believed to have better capabilities than vertical separators with regards to multiphase separation. The increasing demand, however, for enhanced rate gas/liquid separators presents diverse challenges.

The main constraint in designing a gas/liquid separator arises in the size and weight limits dictated by transportation authorities. By restricting the size of the separator vessel, gravitational capacities decrease, flow rate capacities decrease, and expected volumes decrease as well. To counteract this constraint, particular care must be given to the design of internal devices.

Internal devices, such as demisters can be made of a single demister element, which allows liquid components in natural gas to be captured, and the gas to pass through. However, increasing flow rates can decrease the efficiency of the single element demister. Demisters can also employ a second element to serve the same function after the gas passes through the first demister element. Prior mist extractors of this type may be seen in U.S. Pat. No. 4,539,023, where a ceramic mist extractor and a stainless steel mist extractor are described. The gas stream is forced to flow through a settling section where turbulence ends. In the settling section, the heavier liquids drop out and then the gas stream passes over a secondary tall baffle down through the primary ceramic mist extractor and ceramic chips or bodies therein and then upwardly over a tall baffle which forms a partition across the interior of the tank except an upper most portion thereof. The gas stream then flows downwardly through the stainless steel mist extractor. The ceramic mist extractor and the stainless steel mist extractor are horizontally oriented and segregated from each other in a formation that causes the gas stream to change direction in order to flow through the next element. The restricted gas flow through the mist extractors results in a pressure drop across the extractor material and causes them to operate at a lower temperature than that of the gas stream.

The present disclosure describes an improved horizontal gravitational separator that overcomes the deficiencies discussed above.

BRIEF SUMMARY OF THE DISCLOSURE

In one version, one embodiment of the present disclosure describes a separator. The separator, in that embodiment, includes a gas/liquid separator vessel, an enclosure, a coalescer and a demister. The gas/liquid separator vessel has a first end, a second end, a first inlet, a first outlet, and a first separation chamber. The first inlet can be adjacent to the first end. The enclosure is positioned within the first separation chamber of the gas/liquid separator vessel. The enclosure has a second inlet, a second outlet, a drain positioned between the second inlet and second outlet, and a second separation chamber. The second inlet can be directed towards the first end of the gas/liquid separator vessel. The second separation chamber defining a flow path for a gas stream in which the flow path passes sequentially through the second inlet, second separation chamber and the second outlet. The coalescer is positioned in the second separation chamber to intercept the flow path of the gas stream. The demister is positioned in the second separation chamber between the coalescer and the second outlet to intercept the flow path of the gas stream.

The separator can be constructed in a variety of manners. For example, the enclosure may have a first portion sloping downwardly toward the drain with the first portion positioned between the coalescer and the drain.

The second inlet can be substantially the same size and shape as the coalescer, and wherein the coalescer is sealed within the second inlet. Alternatively, the coalescer may be substantially adjacent to the second inlet. With respect to the second outlet, the second outlet can be the first outlet or separate from the first outlet.

The drain preferably communicates with the first separation chamber and the second separation chamber and may be sized to retain fluid within the enclosure to thereby form a plug so that gas will not exit through the drain.

The second separation chamber can be defined by the enclosure, and/or defined by a combination of the gas/liquid separator vessel and the enclosure.

Preferably, the coalescer includes a major axis extending vertically within the enclosure, and the coalescer and the demister are positioned in parallel. The coalescer and the demister may have a semi-circular shape.

In another aspect, the coalescer has a coalescing area facing the second inlet, and wherein the demister has a demisting area facing the coalescer, and wherein the coalescing area is greater than the demisting area.

Preferably, the flow path is substantially linear between first inlet, the coalescer and the demister.

In yet another version, at least one embodiment of the present disclosure describes a method for making a separator. In this method, an enclosure is mounted in a gas/liquid separator vessel having a first outlet adjacent to the first end of the gas/liquid separator vessel to define a first separation chamber and a second separation chamber with the second separation chamber communicating with a first outlet of the gas/liquid separator vessel and the first separation chamber. The enclosure may define a second inlet directed towards the first end of the gas/liquid separator vessel. A coalescer and a demister are mounted within the second separation chamber such that the demister is located between the coalescer and the first outlet.

In one aspect, the coalescer is mounted within the second separation chamber such that a major axis of the coalescer extends vertically within the second separation chamber.

In another aspect, the demister is mounted within the second separation chamber such that a major axis of the demister extends vertically within the second separation chamber.

In yet another aspect, the enclosure defines a drain, and wherein the step of mounting the coalescer and the demister within the second separation chamber is defined further as mounting the coalescer and the demister within the second separation chamber such that the drain is positioned between the coalescer and the demister.

BRIEF DESCRIPTION OF THE DRAWINGS

Certain embodiments of the present invention will hereafter be described with reference to the accompanying drawings, wherein like reference numerals denote like elements, and:

FIG. 3 is a partial cross sectional schematic view of a coalescer and demister assembly according to an embodiment of the present disclosure;

FIG. 4 is a partial cross sectional schematic view of the separator taken along the lines 4-4 of FIG. 3;

FIG. 5 is a cross sectional view of the coalescer and demister assembly taken along the lines 5-5 of FIG. 3 according to an embodiment of the present disclosure;

FIG. 6 is a front elevational view of a coalescer according to the embodiment of FIG. 3;

FIG. 7 is a side elevational view of the coalescer depicted in FIG. 6;

FIG. 8 is a front elevational view of a demister according to the embodiment of FIG. 3; and FIG. 9 is a side elevational view of the demister depicted in FIG. 8.

DETAILED DESCRIPTION

Specific embodiments of the present disclosure will now be described in detail with reference to the accompanying drawings. Further, in the following detailed description of embodiments of the present disclosure, numerous specific details are set forth in order to provide a more thorough understanding of the invention. However, it will be apparent to one of ordinary skill in the art that the embodiments disclosed herein may be practiced without these specific details. In other instances, well-known features have not been described in detail to avoid unnecessarily complicating the description.

The terminology and phraseology used herein is solely used for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Figure 1:
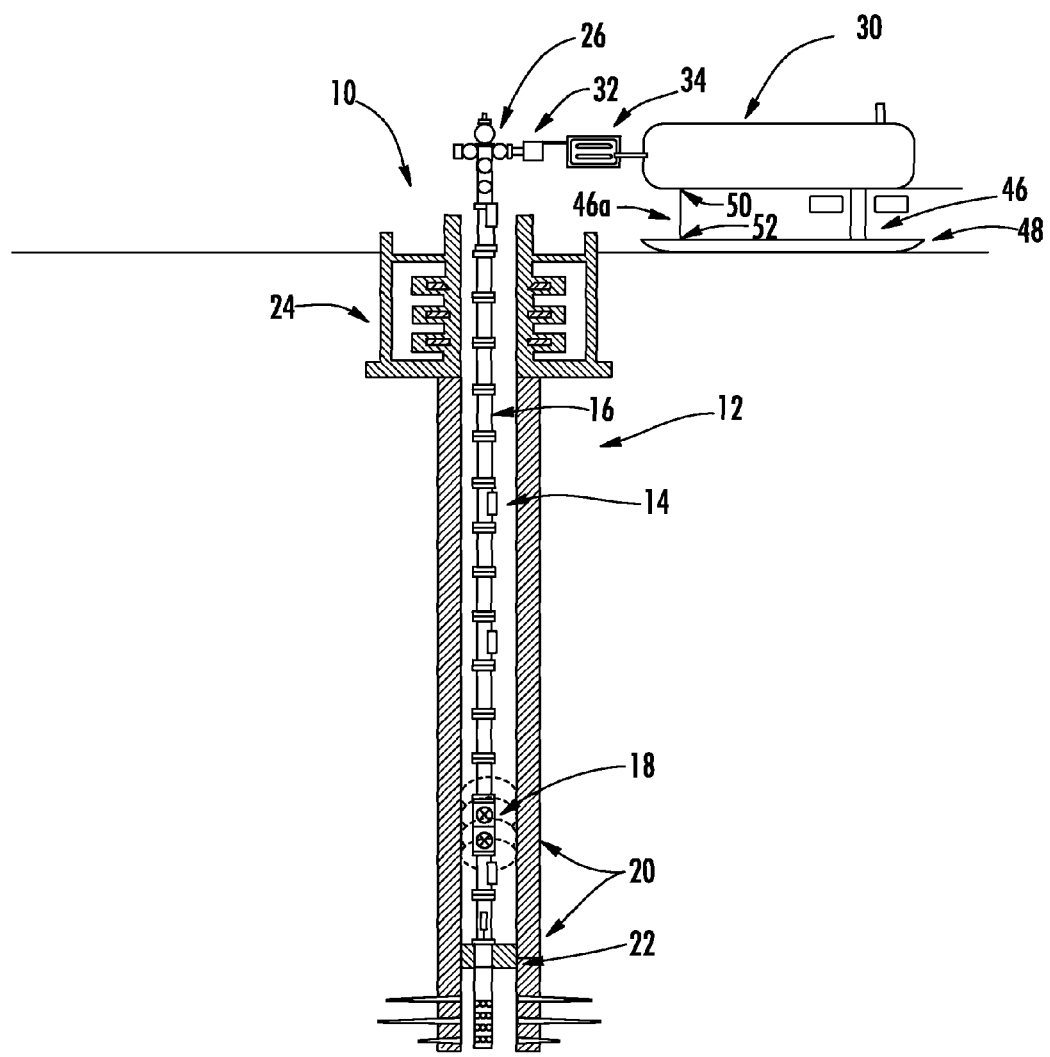
FIG. 1 is a schematic view of a well with a separator according to an embodiment of the present disclosure.

The present invention is particularly applicable to production and/or testing installations 10 (hereinafter "installations 10") such as are used in oil and gas wells or the like. FIG. 1 shows a schematic view of such an installation. The exemplary embodiment of the installation 10 is composed of a well 12, which may contain steel casing 14, tubing 16, valves 18, downhole equipment 20, a packer 22, and well head equipment 24. At the surface of the well 12 is usually located a temporary production tree 26 connected to the tubing 16 for regulating and directing effluent coming out of the well 12. Once the well 12 has been drilled through a formation, the oil rigs and workover rigs used to drill and complete the well 12 are removed. In the example of FIG. 1, the well 12 has been lined with the steel casing 14 (cased hole) in the conventional manner, although similar systems can be used in unlined (open hole) environments. The well head equipment 24 is then installed at the top of the well 12. The well head equipment 24 can include blow-out preventers, connections for fluid, power and data communication, and the production tree (or flow head) 26. An outlet valve of the flow head 26 can be connected to a choke manifold 32 where pressure and flow rate are controlled. Downstream of the choke manifold 32 may be located a heat exchanger 34 regulating the temperature of the effluent. From the heat exchanger 34, the effluent then flows into the separator 30 for the separation of oil, gas, and water, and further directs the flow from the well 12 to a distribution network of pipelines and tanks. An effluent flows out of the well 12 through the well head equipment 24. The effluent passes through the production tree 26 and into the choke manifold 32 which regulates and maintains pressure. The effluent then flows from the choke manifold 32 through the heat exchanger 34. Between the flow head 26 and the separator 30, a solids separator (not shown) may also be provided. In the particular application of the separator 30 to the oil industry, the separator 30 can be a three-phase separator that separates the multiphase effluent into single-phase streams of oil, gas, and water.

Figure 2:
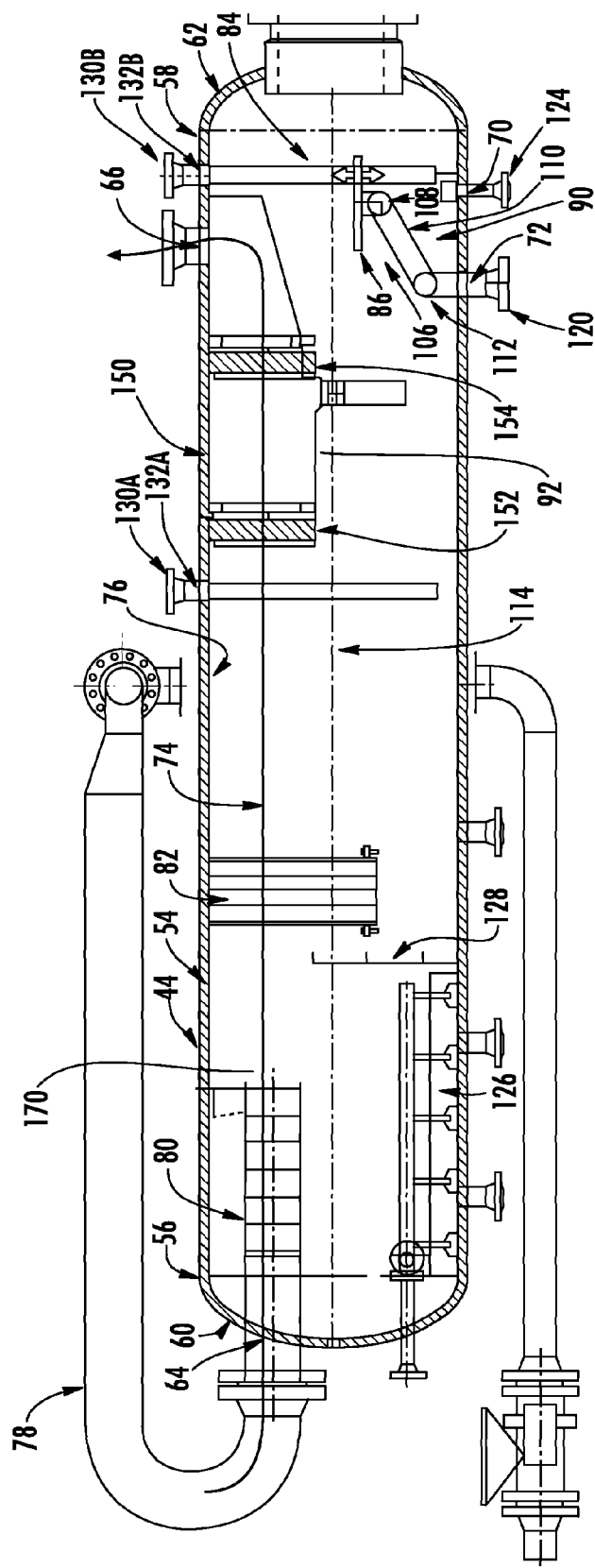
FIG. 2 is a partial cross sectional schematic view of a gas/liquid separator vessel of the separator according to the embodiment of FIG. 1.

Referring now to FIG. 2, shown therein is a schematic cross sectional view of the separator 30 according to a preferred embodiment of the invention. The separator 30 is provided with a gas/liquid separator vessel 44 which may be provided with support mechanisms including stand element(s) 46a and 46b and a frame 48 as depicted in FIG. 1. The stand element(s) 46a and 46b have a top side 50 and a bottom side 52, the top side 50 supporting the gas/liquid separator vessel 44, and the bottom side 52 being supported by the frame 48. Returning to FIG. 2, the gas/liquid separator vessel 44 is provided, having a first end 56, a second end 58 and one or more wall 54 extending therebetween. The gas/liquid separator vessel 44 also includes a first end cap 60, a second end cap 62, a first inlet 64, and a first outlet 66. The first inlet 64 can be adjacent to the first end 56, as shown for example in FIG. 2. In one preferred embodiment, as shown in FIG. 2, but not by way of limitation, the gas/liquid separator vessel 44 is also provided with a water outlet 70 and an oil outlet 72. The wall 54 of the gas/liquid separator vessel 44 is preferably, but not by way of limitation, a cylindrical shape. The first end 56 is connected to the first end cap 60, and the second end 58 is connected to the second end cap 62, with the first end cap 60 and the second end cap 62 covering the first end 56 and the second end 58, respectively. The gas/liquid separator vessel 44 defines a first separation chamber 74 substantially defined by an interior surface 76 of the gas/liquid separator vessel 44.

The separator 30 may be provided with an inlet device 80, an agglomerator 82, an adjustable collecting assembly 84 comprised of an oil collector 86, an articulated oil circuit 90 (an example of a suitable articulated oil circuit is described, for example, in U.S. Pat. No. 7,654,397), and a coalescer and demister assembly 92 as the final stage of the separation of the effluent. Prior to arriving at the inlet device 80, the effluent preferably travels through an inlet pipe 78. The inlet pipe 78 can be U-shaped, and can be approximately 10 inches in diameter. The U-shape of the inlet pipe 78 is designed to provide an initial centrifugal separation and provide an even gas flow distribution. The U-shape of the inlet pipe 78 is positioned outside of the gas/liquid separator vessel 44. The inlet device 80 may be connected in series with the inlet pipe 78 and placed through the first inlet 64 of the gas/liquid separator vessel 44. The inlet device is also preferably designed to achieve a reduction in the velocity of the effluent and to provide an even gas flow distribution within the gas/liquid separator vessel 44. Test results show that even gas velocities allow the liquid droplets to drop out by gravity more efficiently. Inlet devices 80 are well known in the art and may be for example, but not by way of limitation, inlet breakers, cyclone clusters, or vane types also called Schoepentoeters as described in WO 03/070348. The inlet device 80 may aid in creating more homogeneous downstream gas velocities and present the advantage of enhanced bulk liquid/mist separation.

Additionally, the gas/liquid separator vessel 44 may contain an agglomerator 82 to intercept the medium sized liquid droplets carried over with the effluent and form a liquid film flowing along the agglomerator 82 towards the bottom of the gas/liquid separator vessel 44 (coalescence effect). The agglomerator 82 can be formed of coalescer plates made of, as an example but not by way of limitation, several vertical plates assembled as a packing, a vane-type agglomerator or the like.

After separation, water leaves the first separation chamber 74 and the gas/liquid separator vessel 44 through the water outlet 70. The water leaving the water outlet 70 may optionally be passed through a water treatment system (not shown). A water control valve (not shown) may be connected to the water outlet 70 for adjusting the flow of water released from the gas/liquid separator vessel 44. The water control valve regulates the water/emulsion interface level. For a constant total liquid level, the higher the water flow-rate leaving the gas/liquid separator vessel 44, the higher the interface level will be (this is due to the minimum retention time needed). Additionally, the separator 30 can be fitted with an anti-foam wall 126 and a sand removal system 128 for a better water, oil, and water/oil emulsion quality. To detect the total level of liquid within the gas/liquid separator vessel 44 and the interface water/oil, radar element(s) 130A and 130B, shown in FIGS. 2 and 3, may be used in the gas/liquid separator vessel 44. The radar element(s) 130A and 130B can be installed through openings 132A and 132B, respectively, in the gas/liquid separator vessel 44.

Referring now to FIG. 3, shown therein is an exemplary coalescer and demister assembly 92. The coalescer and demister assembly 92 is provided with an enclosure 150, a coalescer 152, a demister 154, one or more drain(s) 156, and one or more drain pipe(s) 158. The enclosure 150 defines a second inlet 160 and may also define a second outlet 162. In the example shown in FIG. 3, the second outlet 162 is defined by the gas/liquid separator vessel 44, i.e., the second outlet 162 is the first outlet 66 of the gas/liquid separator vessel 44. The second inlet 160 can be directed towards the first end 56 of the gas/liquid separator vessel 44. The enclosure 150 establishes a flow path 170 sequentially passing through the second inlet 160, the coalescer 152, a second separation chamber 165, the demister 154, and finally through the second outlet 162. The coalescer 152 extends vertically within the enclosure 150. In one preferred embodiment, the coalescer 152 includes a first major axis 166 extending vertically within the second separation chamber 165 defined by the enclosure 150. Similarly, the demister 154 extends vertically within the enclosure 150. The coalescer 152 and demister 154 are preferably positioned parallel within the enclosure 150 in the second separation chamber 165.

Information indicative of the total liquid level in the gas/liquid separator vessel 44 from the radar elements 130A and 130B can be used to control the oil outlet control valve 120 and the water control valve 124 to maintain the total liquid level below the coalescer 152 and the demister 154. Preferably, the total liquid level is maintained at a predetermined distance below the enclosure 150 to provide a safety margin in case of unexpected liquid level increases caused by a slug, inclination of the gas/liquid separator vessel 44 and/or rig movement.

The enclosure 150 includes a first portion 172A, a second portion 172B, a first end 174 and a second end 176. The first portion 172A extends from the first end 174 to the drain 156 and generally between the coalescer 152 and the demister 154. The second portion 172B extends from the second end 176 to the drain 156. The first and second portions 172A and 172B are sloped towards the drain 156 so that any fluid separated by the coalescer 152 and the demister 154 flow toward the drain 156. The drain 156 is sized based upon the expected amount of fluid to be separated by the coalescer 152 and the demister 154. In particular, the drain 156 is sized to maintain fluid within the second separation chamber 165 to form a plug over the drain 156 so that gas from the second separation chamber 165 does not flow through the drain 156. As shown in FIG. 4, in a preferred embodiment but not by way of limitation, the enclosure 150 is provided with three drains 156A, 156B, and 156C and drain pipes 158A, 158B, and 158C positioned through the drains 156A, 156B and 156C. The drain pipes 158A, 158B and 158C extend from the enclosure 150 into the first separation chamber 74.

Referring now to FIGS. 2 and 3, an effluent to be separated flows into the gas/liquid separator vessel 44 via the inlet pipe 78 and thereby into the first separation chamber 74 through the first inlet 64 and follows a flow path 170, which may be referred to herein as a "gas stream" and/or a "wet gas stream." The flow path 170 sequentially passes through the first separation chamber 74, the coalescer and demister assembly 92 and the second outlet 162. The effluent is for example a multiphase fluid mixture provided by the installation 10 after having passed through a solids separator, the pressure reducer 32, and the heat exchanger 34. The separator 30 operates according to the well-known principle of gravitational separation wherein the different phases of the effluent settle out by gravity. The effluent and/or wet gas stream can have entrained liquid droplets therein.

The coalescer 152 is positioned within the second separation chamber 165 defined by the enclosure 150, and preferably adjacent to the first end 174 thereof. The coalescer 152 also extends across the second inlet 160 such that the flow path 170 of the effluent is directed through the coalescer 152. The demister 154 is positioned downstream in the flow path 170 relative to the coalescer 152 such that the effluent passes sequentially through the coalescer 152 and the demister 154. In a preferred embodiment, the flow path 170 is linear between the coalescer 152 and the demister 154.

As shown in FIG. 4, the second inlet 160 is substantially the same size and shape as the coalescer 152. The coalescer 152 is sealed within the second inlet 160 to cause all of the effluent to pass through the coalescer 152. The coalescer 152, in one embodiment, is sealed in place using a plurality of clamps 205, two being shown by way of example in FIG. 4. However, it should be understood that the exemplary embodiments for sealing the coalescer 152 substantially adjacent to the second inlet 160 is in no way intended to limit the manner by which the coalescer 152 may be mounted and/or sealed within the enclosure 150.

Referring now to FIG. 6, shown therein is an exemplary embodiment of the coalescer 152. The coalescer 152 is provided with a frame 200 and one or more coalescing element, such as a mesh pad 204, with three mesh pads 204A-C being shown by way of example. The coalescer 152 can be provided with 2, 3, 4, 5, . . . 8, 9, 10 or more mesh pads. The frame 200 is provided with one or more frame panels 206, with three frame panels 206A-C being shown by way of example. The frame panels 206A-C can be connected together by way of cleats 208A-D. The frame 200 has a height 210 and a length 212. The height 210 and the length 212 can vary depending upon the size and/or capacity of the separator 30. In one version, a ratio of length 212 to height 210 can be between 1.75-2.5. The gas/liquid separator vessel 44 has a width 220. The length 212 can be equal to the width 220, or different from the width 220. In compliance with the current API 12J industry standard, the length 212 is calculated to maintain a liquid retention time of 1 minute.

As discussed above, the coalescer 152 is sized and shaped to encompass the second inlet 160. When the gas/liquid separator vessel 44 has a cylindrical shape, the frame 200 can be a semi-circular or semi-elliptical shape as shown in FIGS. 4 and 6. In this example, the frame 200 of the coalescer 152 defines an arch corresponding to interior surface 76 of the gas/liquid separator vessel 44, and a planar surface corresponding to the enclosure 150. The frame panels 206A-D shown in this embodiment have interior and exterior sides. The interior sides of the frame panels 206A-C define openings into which the mesh pads 204A-C, respectively, may be placed. The mesh pads 204A-C may be affixed to the frame panels 206A-C through the use of any number of attachment devices and methods.

Each of the frame panels 206A-C defines an opening 214. In the example shown, a single mesh pad 204A-C is mounted with the openings 214, although multiple mesh pads 204 can be mounted within each of the openings 214. The mesh pads 204A-C can be constructed of stainless steel, and/or other suitable material, and collectively encompass a coalescing area facing the flow path 170. The mesh pads 204A-C are identical in construction and function and the mesh pad 204A is shown in FIG. 7 by way of example. The mesh pad 204A is provided with a thickness 218 which can vary, but which can be 100 mm by way of example. The frame panels 206A-C are connected together by cleats 208A-D.

Referring now to FIG. 8, shown therein is an exemplary embodiment of the demister 154. The demister 154 is preferably similar in construction as the coalescer 152 discussed above, with the exception that the demister 154 can be smaller to allow the liquid drainage from the coalescer 152. In particular, the demister 154 is provided with a frame 300 supporting one or more demisting elements, such as mesh pad(s) 302A-C. The frame 300 can be provided with at least one frame panel(s) 304A-C, and in this preferred embodiment, the frame panels 304A-C are affixed using cleats 306A-D. In the example shown, the frame 300 has a height 310 and a length 312. The height 310 can be less than the height 210 of the coalescer 152, while the length 312 is preferably the same as the length 212 (and the width 220 of the gas/liquid separator vessel 44). In a preferred embodiment, the height 310 and length 312 is less than the diameter of the gas/liquid separator vessel 44. The frame 300 has exterior and interior sides with one exterior side, as shown in the preferred embodiment, defining an arch corresponding to the upper interior side of the gas/liquid separator vessel 44 adjacent to the second outlet 162. The opposing side of the frame 300 defines a flat surface substantially corresponding to a lower interior side of the enclosure 150 adjacent to the second outlet 162. The frame panels 304A-C shown in this embodiment have interior and exterior sides. The interior sides of the frame panels 304A-C define openings into which the mesh pads 302A-C, respectively, are mounted. It will be known to those skilled in the art that the mesh pads 302A-C may be affixed to their respective frame panels 304A-C through the use of any number of attachment devices and methods.

The demister 154 may be composed of three, mesh pads 302A, 302B, and 302C. In this embodiment, each mesh pad 302 is housed in a frame panel 304A-C respectively. The frame panels 304A-C can be provided with any suitable size. As seen in FIG. 9, the mesh pads 302A-C have a thickness 320, which may be approximately 100 mm. Affixing the frame panels 304A-D to each other are cleats 306A-D.

Referring to FIGS. 1 and 2, due to transportation needs, the separator 30 can be standardized to a 30 ft (9.14 m) container footprint and with a weight preferably not exceeding twenty-five tons. In regards to separator 30 sizing, liquid mist separation from the gas is the main challenge. The vessel diameter may be restricted by regulations dictated by the transportation authorities. The maximum level of liquid in the tank may be limited by the height of the coalescer and demister assembly 92 in order to maintain the coalescer 152 and the demister 154 above the liquid level. The vessel size may be a compromise between effluent capacity and transportability with the separator 30 being advantageously transportable from one installation 10 to another. Once both the length and diameter of the separator 30 are determined, the oil retention time should be evaluated. According to API 12J, a minimum of 1 minute is recommended to allow the gas dissolved in the liquid to be freed, although this retention time may change in the future as required by the operator, the well conditions, or industry standard.

Liquid droplet size in part dictates the quality of the separation in the separator 30. Inlet sizing mainly determines droplet sizes, and the optimization of separator 30 internals. Bulk-liquid gas separation from stratified flows can be accomplished by gravitation. A liquid retention time set to 1 minute allows bubble flows to separate by gravitation. The situation is different for the annular regime where liquid mist appears (formation of droplets in suspension in the gas) and a thin layer of liquid appears along the wall. In terms of droplet sizes and mist fractions present at/near the inlet, large droplet sizes and small mist fractions are preferable. The following equation (1) gives the mean volume drop size d (droplets having diameters greater than d occupy half of the spray volume) as a function of the inlet pipe diameter and the gas velocity.

$$d = F(\rho_g, \rho_l, \sigma) \cdot \frac{\sqrt{D}}{u_g} \qquad \text{Equation (1)}$$

D is the droplet diameter, F is a function, and D is a hydraulic diameter of the inlet pipe 78. Equation (1) shows that the inlet pipe 78 diameter has to be as large as possible to increase droplets size. As the inlet pipe 78 diameter increases, fluid velocities decrease. With the lower velocities, turbulence dissipation rates are decreased, and liquid shattering is reduced allowing a better agglomeration of droplets. By way of example and not by way of limitation, the preferred embodiment, shown in FIG. 2, shows the inlet pipe 78 with a diameter of ten inches to accommodate high flow rates. This inlet pipe 78 diameter reduces the mist fraction (droplets coalesce against the wall with the liquid film) and provide bigger droplets in such high flow rate conditions. The long section of inlet pipe 78 permits stabilization of the flow and thus reduces turbulence dissipation and the droplet shattering risk is reduced.

Referring back to FIGS. 2 and 3, in order to accommodate a flow rate above 17,000 Barrels of Oil Per Day (BOPD) and more than 90 Million Standard Cubic Feet per Day (MMSCFD), the separator 30 preferably has a liquid retention time at a minimum of one minute and gas/liquid interface 114 level of fifty percent. The level of the gas/liquid interface 144 is restricted to fifty percent to assure the coalescer 152 and demister 154 remain above the bulk liquid. The coalescer 152 and the demister 154 in this embodiment of the invention are provided with mesh pads. The coalescer 152 has a coalescing area facing the second inlet 160. The demister 154 has a demisting area facing the coalescer 152. The coalescing area is greater than that of the demister area. The coalescer 152 and demister 154 are used as part of the last stage of separation and remove liquid droplets above 10 μm from the gas stream traveling along the flow path 170.

Three different separation mechanisms are relevant for a mesh pad. These three mechanisms are inertial impaction, direct interception, and Brownian diffusion. Brownian diffusion is only relevant for very small droplets in the sub-micron range and its contribution to the total carry over can be neglected. Inertial impaction is known to be the main contributor to the efficiency of the mesh. The gas stream moves freely through the pad and the inertia of the droplets causes them to impact the wires. The liquid collected then falls down by gravity.

Inertial mechanism applies for large droplets (5-10 μm or larger). Less than 3% of the volume distribution represents droplets below 10 μm diameter.

In general, the mesh pads 204A-D and 304A-D can either work as a demister or as an agglomerator depending on gas velocities and liquid load. A mesh pad is described by its k-factor:

$$K = vg \sqrt{\frac{\rho_g}{\rho_1 - \rho_g}} \quad \text{Equation (2)}$$

where $v_g$ is the gas velocity within the mesh pad, $\rho_g$ is the gas density and $\rho_1$ is the liquid density. For K-factors higher than 0.1 m/s, the mesh pad is flooded and acts as an agglomerator. When K-factors are higher than 0.1 m/s, liquid is re-entrained downstream of the mesh pad and if not drained, liquid will be polluting the gas line. When the mesh pad acts as a demister, liquid is captured in the mesh and drains down by gravity (upstream of the mesh). If the gas velocity upstream of a mesh pad exceeds a certain limit, the droplets that have coalesced in the mesh pad, can no longer be drained efficiently by gravity and liquid starts building up in the mesh. The point where droplet reentrainment happens is called the flooding point. A common way to quantify this flooding point is to use the K-factor defined above.

The mesh pads 204A-C and 304A-C may be formed of knitted wires, assembled in such a way that a large contact surface in combination with a large open area is created. The open area provides an unobstructed gas flow through the mesh pads 204A-C and 304A-C with low pressure drop and the knitted wires capture the liquid droplets driven by inertia. The mesh pads 204A-C and 304A-C are characterized by their K-factor. Meshes can have different behaviors depending on gas velocities (K-factor) and liquid load conditions. After capture, the droplets coalesce and drain down by gravity. As gas velocity increases, the liquid captured in the mesh pads 204A-C and 304A-C do not have time to drop by gravity. The mesh pads 204A-C and 304A-C get rapidly fully loaded. At a certain point liquid gets reentrained at a downstream side of the mesh pads 204A-C and 304A-C. The point is that droplets have coalesced and are bigger downstream of the mesh than upstream, the mesh thus acts as a liquid agglomerator. The pressure drop across the mesh also acts as a very good flow distributor.

It is for this reason, in the embodiment depicted in FIG. 3, the coalescer 152 may function as an agglomerator. Functioning as an agglomerator, some of the liquid load of the gas stream is removed by flowing through the coalescer 152. The remaining liquid re-entrains in the gas stream and is passed along the flow path 170 through the second separation chamber 165 to the demister 154. The liquid recovered downstream, which is not re-entrained in the gas stream, is drained from the coalescer 152 through the drain 156 into the first separation chamber 74 of the gas/liquid separator vessel 44. The K-factor of the demister 154 is higher, because of the smaller cross sectional area, than the coalescer 152. This allows liquid drainage between the coalescer 152 and the demister 154. When the coalescer 152 acts as an agglomerator, the liquid load is drastically decreased from the gas flow and the demister 154 acts as a demister. The liquid re-entrained in the gas stream flows through the mesh pad of the demister 154. In other preferred embodiments, additional mesh pads are added in series to act as subsequent demisters, thereby improving efficiency. This improved efficiency is in part based on the even gas flow distribution on the face of the coalescer 152 and demister 154. After interacting with the coalescer 152 and the demister 154, the flow path 170 continues through the second separation chamber 165, after passing through the demister 154, and is released through the second outlet 162, which in this embodiment corresponds to the first outlet 66 of the gas/liquid separator vessel 44. In a preferred embodiment, the enclosure 150 extends past the first outlet 66 such that the second separation chamber 165 directly communicates with the first outlet 66.

After separation, the gas leaves the gas/liquid separator vessel 44 through the first outlet 66 before being burnt off in a flare (not shown), the oil-enriched liquid leaves the gas/liquid separator vessel 44 through the oil outlet 72 before going to an oil burner or a storage tank (not shown), and the water-enriched liquid leaves the gas/liquid separator vessel 44 through water outlet 70 before being rejected or optionally going through a water treatment system (not shown).

Although only a few embodiments of the present invention have been described in detail above, those of ordinary skill in the art will readily appreciate that many modifications are possible without materially departing from the teachings of the present invention. Accordingly, such modifications are intended to be included within the scope of the present invention as defined in the claims.

What is claimed is:

1. A separator comprising:
   a gas/liquid separator vessel having a first end, a second end, a first inlet, a first outlet, and a first separation chamber, the first inlet being adjacent to the first end;
   an enclosure positioned within the first separation chamber of the gas/liquid separator vessel, the enclosure having a second inlet, a second outlet, at least one drain positioned between the second inlet and second outlet, and a second separation chamber, the second inlet directed towards the first end of the gas/liquid separator vessel, the second separation chamber defining a flow path for a gas stream in which the flow path passes sequentially through the second inlet, second separation chamber and the second outlet;
   a mesh pad coalescer positioned in the second separation chamber to intercept the flow path of the gas stream, said coalescer of a given k-factor; and a mesh pad demister positioned in the second separation chamber between the coalescer and the second outlet to intercept the flow path of the gas stream, said demister of a k-factor greater than the given k-factor of said coalescer to enhance liquid drainage at the at least one drain therebetween.

2. The separator of claim 1, wherein the enclosure has a first portion sloping downwardly toward the at least one drain.

3. The separator of claim 2, wherein the first portion is positioned between the coalescer and the at least one drain.

4. The separator of claim 1, wherein the second inlet is substantially the same size and shape as the coalescer, and wherein the coalescer is sealed within the second inlet.

5. The separator of claim 1, wherein the coalescer is substantially adjacent to the second inlet.

6. The separator of claim 1, wherein the second outlet is the first outlet.

7. The separator of claim 1, wherein the at least one drain communicates with the first separation chamber and the second separation chamber.

8. The separator of claim 1, wherein the second separation chamber is defined by the enclosure.

9. The separator of claim 1, wherein the coalescer includes a major axis extending vertically within the enclosure.

10. The separator of claim 9, wherein the coalescer and the demister are positioned in parallel.

11. The separator of claim 1, wherein the coalescer has a coalescing area facing the second inlet, and wherein the demister has a demisting area facing the coalescer, and wherein the coalescing area is greater than the demisting area.

12. The separator of claim 1, wherein the flow path is substantially linear between the coalescer and the demister.

13. The separator of claim 1, wherein the gas stream is a wet gas stream having entrained liquid droplets therein.

14. The separator of claim 1, further comprising an inlet pipe connected to the first inlet, the inlet pipe having a U-shape to provide a centrifugal separation.

15. The separator of claim 14, wherein the U-shape of the inlet pipe is positioned outside of the gas/liquid separator vessel.

16. The separator of claim 1, wherein the coalescer has a semi-circular shape.

17. A method for making a separator comprising the steps of:

mounting an enclosure in a gas/liquid separator vessel having a first outlet adjacent to a first end of the gas/liquid separator vessel to define a first separation chamber and a second separation chamber with the second separation chamber communicating with a first outlet of the gas/liquid separator vessel and the first separation chamber, the enclosure defining a second inlet directed towards the first end of the gas/liquid separator vessel;

mounting a mesh pad coalescer and a mesh pad demister within the second separation chamber such that the demister is located between the coalescer and the first outlet; and allowing a pressure drop across the mesh pad coalescer in the face of a gas flow to enhance flow distribution thereacross.

18. The method of claim 17 wherein the step of mounting the coalescer within the second separation chamber is defined further as mounting the coalescer within the second separation chamber such that a major axis of the coalescer extends vertically within the second separation chamber.

19. The method of claim 17 wherein the step of mounting the demister within the second separation chamber is defined further as mounting the demister within the second separation chamber such that a major axis of the demister extends vertically within the second separation chamber.

20. The method of claim 17 wherein the enclosure defines at least one drain, and wherein the step of mounting the coalescer and the demister within the second separation chamber is defined further as mounting the coalescer and the demister within the second separation chamber such that the at least one drain is positioned between the coalescer and the demister.

* * * * *